(12) United States Patent
Chen et al.

(10) Patent No.: US 11,935,300 B2
(45) Date of Patent: Mar. 19, 2024

(54) TECHNIQUES FOR GENERATING CANDIDATE MATCH CUTS

(71) Applicant: NETFLIX, INC., Los Gatos, CA (US)

(72) Inventors: Boris Anthony Chen, Palo Alto, CA (US); Amirreza Ziai, Menlo Park, CA (US); Kelli Rebecca Griggs, Running Springs, CA (US); Rebecca Suzanne Tucker, Boulder, CO (US)

(73) Assignee: NETFLIX, INC., Los Gatos, CA (US)

( * ) Notice: Subject to any disclaimer, the term of this patent is extended or adjusted under 35 U.S.C. 154(b) by 20 days.

(21) Appl. No.: 17/520,505

(22) Filed: Nov. 5, 2021

(65) Prior Publication Data
US 2023/0147904 A1    May 11, 2023

(51) Int. Cl.
*G06V 20/40* (2022.01)
*G06F 18/2413* (2023.01)

(52) U.S. Cl.
CPC ........ *G06V 20/49* (2022.01); *G06F 18/24147* (2023.01); *G06V 20/46* (2022.01)

(58) Field of Classification Search
CPC ... G06V 20/49; G06V 20/46; G06F 18/24147
USPC ........................................................ 386/241
See application file for complete search history.

(56) References Cited

U.S. PATENT DOCUMENTS

| | | | | |
|---|---|---|---|---|
| 6,633,651 B1* | 10/2003 | Hirzalla | ................ | G06V 20/40 382/218 |
| 10,506,235 B2* | 12/2019 | Coward | ............... | H04N 19/436 |
| 10,742,708 B2* | 8/2020 | Katsavounidis | ..... | H04N 19/147 |
| 11,184,621 B2* | 11/2021 | Katsavounidis | ...... | H04L 65/612 |
| 11,368,762 B2* | 6/2022 | Oishi | .................... | G06V 10/82 |
| 2014/0003523 A1* | 1/2014 | Soroushian | ............ | H04N 19/40 375/E7.243 |
| 2017/0083770 A1 | 3/2017 | Carlson et al. | | |
| 2022/0086453 A1* | 3/2022 | Katsavounidis | ...... | H04L 65/762 |
| 2023/0120437 A1* | 4/2023 | Simic | .................... | G06T 19/00 345/427 |

(Continued)

FOREIGN PATENT DOCUMENTS

WO    WO-2023081669 A1 *  5/2023    ......... G06K 9/00744

OTHER PUBLICATIONS

"Shot transition detection," Wikipedia, available at https://en.wikipedia.org/wiki/Shot_transition_detection, 7 pages.

(Continued)

*Primary Examiner* — Helen Shibru
(74) *Attorney, Agent, or Firm* — Artegis Law Group, LLP

(57) ABSTRACT

In various embodiments, a match cutting application automatically generates candidate match cuts. In some embodiments, the match cutting application detects shot sequences within one or more video sequences, deduplicates the shot sequences, computes an encoding of each shot sequence after the deduplication, and compares the encodings associated with pairs of shot sequences using a distance metric to identify pairs of shot sequences that can be cut together to generate candidate match cuts. In addition, the match cutting application can apply an approximation technique, such as an approximate nearest neighbor search technique, to identify intermediate pairs of shot sequences prior to comparing encodings associated with the intermediate pairs of shot sequences.

20 Claims, 6 Drawing Sheets

(56) References Cited

U.S. PATENT DOCUMENTS

2023/0162502 A1\* 5/2023 Patel ..................... G06F 18/23
                                                         382/103

OTHER PUBLICATIONS

"Perceptual hashing," Wikipedia, available at https://en.wikipedia.org/wiki/Perceptual_hashing, 2 pages.
CNN, https://idealo.github.io/imagededup/methods/cnn/, 4 pages.
Instance Segmentation, https://paperswithcode.com/task/instance-segmentation, 11 pages
Jeremy Jordan, "Evaluating image segmentation models," https://www.jeremyjordan.me/evaluating-image-segmentation-models/, 8 pages.
He et al., "Mask R-CNN", arXiv:1703.06870v3 [cs.CV] Jan. 24, 2018, https://arxiv.org/abs/1703.06870v3#, 12 pages.
International Search Report for Application No. PCT/US2022/079101 dated Mar. 2, 2023.
Leake et al., "Computational Video Editing for Dialogue-Driven Scenes", ACM Transactions on Graphics, DOI: 10.1145/3072959.3073653, vol. 36, No. 4, Article 130, Jul. 2017, pp. 130:1-130:14.
Davis, Abe, "Computational Video Editing for Dialogue-Driven Scenes (Full Video)", Abe Davis's Research, Retrieved from URL:https://www.youtube.com/watch?v=tF43Zqoue20&t=12s, Jun. 22, 2017, 2 pages.
Pardo et al., "Learning to Cut by Watching Movies", IEEE/CVF International Conference on Computer Vision (ICCV), DOI: 10.1109/ICCV48922.2021.00678, Oct. 10, 2021, pp. 6838-6848.
Chen et al., "Match Cutting: Finding Cuts with Smooth Visual Transitions", Oct. 11, 2022, 15 pages.
Wearenetflix, "Match Cutting at Netflix", Retrieved from URL:https://www.youtube.com/watch?v=7jJs5ATcHOw&t=139s, XP93026077, Nov. 17, 2022, 2 pages.

\* cited by examiner

TECHNIQUES FOR GENERATING CANDIDATE MATCH CUTS

BACKGROUND

Field of the Invention

Embodiments of the present disclosure relate generally to computer science and video processing and, more specifically, to techniques for generating candidate match cuts.

Description of the Related Art

A video sequence can include any number of shot sequences, and each shot sequence includes a set of contiguous frames that typically have similar spatial-temporal properties and run for an uninterrupted period of time. A match cut is a transition from one shot sequence to another shot sequence in which the shot sequences include matching subject matter and/or action. A frame match cut is a match cut in which two shot sequences include similar visual elements, such as similar silhouettes of objects, similar lighting, similar framing of objects, or a combination thereof. An action match cut is a match cut in which two shot sequences include similar actions of characters or objects that appear within those shot sequences. Additional examples of match cuts include match cuts that are based on similar camera panning angles within shot sequences, similar colors within shot sequences, similar audio, etc.

Conventional video editing software only includes functionality that permits a user to manually edit shot sequences together to create a match cut. As a general matter, the manual comparison and editing of shot sequences to create match cuts is a tedious and very time consuming process. In addition, given the large number of shot sequence pairs that oftentimes need to be manually compared to identify match cuts, some desirable match cuts may be overlooked, or not adequately explored.

As the foregoing illustrates, what is needed in the art are more effective techniques for creating match cuts candidates.

SUMMARY OF THE EMBODIMENTS

One embodiment of the present disclosure sets forth a computer-implemented method. The method includes detecting a plurality of shot sequences within one or more video sequences. The method further includes generating, for each shot sequence included in the plurality of shot sequences, an encoding associated with the shot sequence. In addition, the method includes generating, for presentation via a video editing application, one or more candidate match cuts between one or more pairs of shot sequences based on the encodings associated with the plurality of shot sequences.

At least one technical advantage of the disclosed techniques relative to the prior art is that the disclosed techniques facilitate the match cutting process by generating and presenting candidate match cuts to a user, without requiring the user to manually compare shot sequences from one or multiple video sequences. In addition, the disclosed techniques can scale efficiently by using approximation techniques to avoid comparing every pair of shot sequences. These technical advantages represent one or more technological advancements over prior art approaches.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

DETAILED DESCRIPTION

As described, conventional video editing software only includes functionality that permits a user to manually edit shot sequences together to create a match cut. The conventional match cutting process can, therefore, be tedious and very time consuming. In addition, given the large number of shot sequence pairs that need to be manually compared to identify match cuts, some desirable match cuts may be overlooked, or not adequately explored.

In the disclosed techniques, a match cutting application automatically generates candidate match cuts for presentation to a user via a video editing application. The user can then select one or more of the candidate match cuts and use and/or edit the selected match cut(s). In some embodiments, to generate candidate match cuts, the match cutting application detects shot sequences within one or more video sequences, deduplicates the shot sequences, computes an encoding of each shot sequence after the deduplication, and compares the encodings associated with pairs of shot sequences using a distance metric to identify pairs of shot sequences that can be cut together to generate candidate match cuts. In addition, the match cutting application can apply an approximation technique, such as an approximate nearest neighbor search technique, to identify intermediate pairs of shot sequences prior to comparing encodings associated with the intermediate pairs of shot sequences.

Advantageously, the disclosed techniques address various limitations of conventional approaches for creating match cuts. More specifically, the disclosed techniques facilitate the match cutting process by generating and presenting candidate match cuts to a user, without requiring the user to manually compare shot sequences from one or multiple video sequences. In addition, the disclosed techniques can scale efficiently by using approximation techniques to avoid comparing every pair of shot sequences.

System Overview

Figure 1:
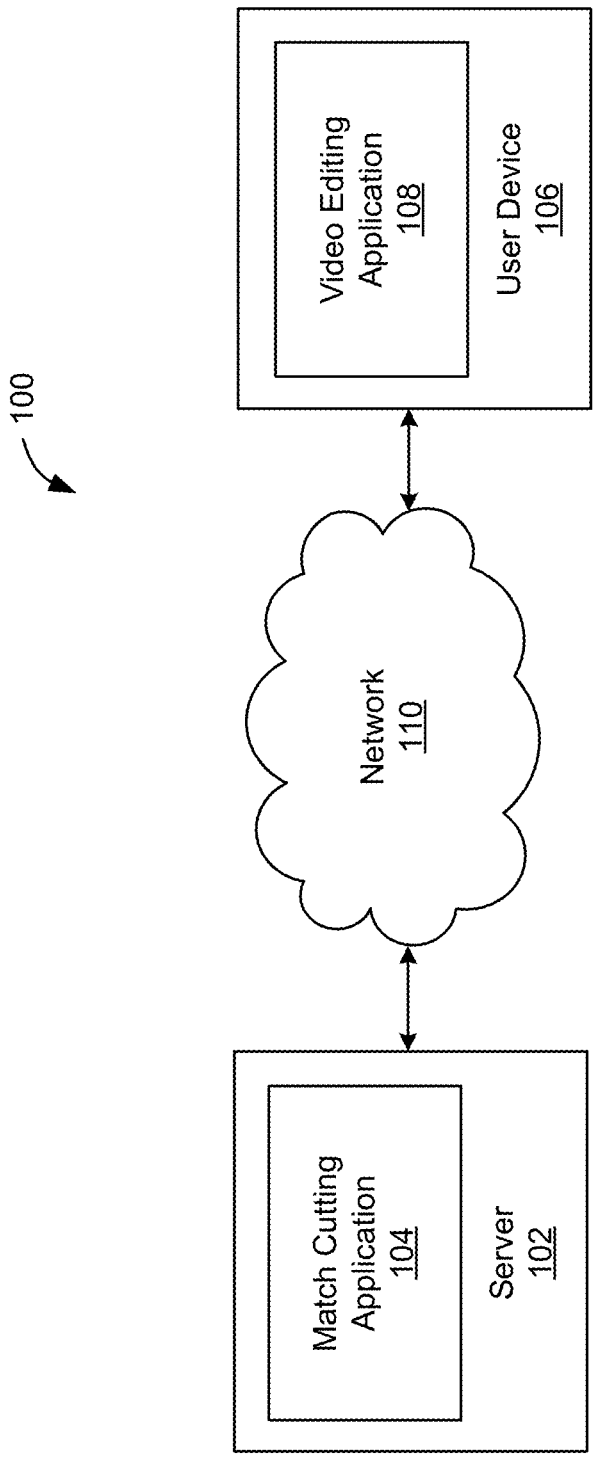
FIG. 1 is a conceptual illustration of a system that is configured to implement one or more aspect of the various embodiments.

FIG. 1 is a conceptual illustration of a system 100 that is configured to implement one or more aspects of the various embodiments. As shown, the system 100 includes a server machine 102 and a user device 106 that communicate over a network 110. The network 110 can be a local area network (LAN) or a wide area network (WAN), such as the Internet.

A match cutting application 104 executes in the server machine 102 to generate candidate match cuts between shot sequences that include matching subject matter and/or action. In some embodiments, the match cutting application 104 detects shot sequences within video sequences, deduplicates the detected shot sequences, encodes the deduplicated shot sequences, and generates candidate match cuts between pairs of shot sequences based on comparisons of the encodings using a distance metric, as discussed in greater below in conjunction with FIGS. 4-6.

The match cutting application 104 outputs candidate match cuts in a format that can be transmitted, via the network 110, to the user device 106 and imported into a video editing application 108 executing in the user device 106. For example, the match cutting application 104 could output candidate match cuts in the Final Cut Pro XML format, which can be imported into a commercially available video editing application, such as Adobe Premier®. The video editing application 108 displays the imported candidate match cuts and permits a user to select among the candidate match cuts, edit the selected match cuts, as well as create and/or edit video sequences that include the selected and/or edited match cuts, as discussed in greater detail below in conjunction with FIG. 4.

Although described herein with primarily respect to the match cutting application 104 running on the server machine 102 and the video editing application 108 running on the user device 106, in some embodiments, functionality of the match cutting application 104 and the video editing application 108 can be implemented via any number of pieces of software that run on any type and number of computing devices. For example, the server machine 102 and/or the user device 106 can be replaced with a virtual computing system, a distributed computing system, or a cloud computing environment, such as a public cloud, a private cloud, or a hybrid cloud, in some embodiments.

Figure 2:
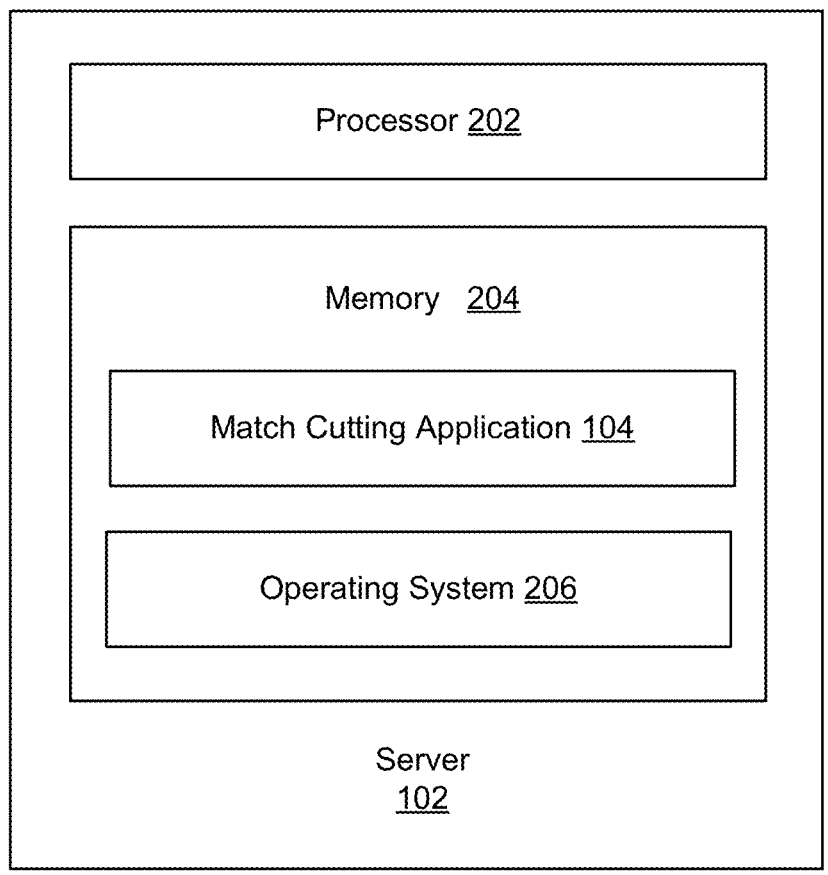
FIG. 2 is a conceptual illustration of the server machine of FIG. 1, according to various embodiments.

FIG. 2 is a conceptual illustration of the server machine 102 of FIG. 1, according to various embodiments. As shown, the server machine 102 includes, without limitation, a processor 202 and a memory 204. The processor 202 may be any instruction execution system, apparatus, or device capable of executing instructions. For example, the processor 202 could comprise a central processing unit (CPU), a graphics processing unit (GPU), a controller, a microcontroller, a state machine, or any combination thereof. The memory 204 stores content, such as software applications and data, for use by the processor 202.

The memory 204 may be one or more of a readily available memory, such as random access memory (RAM), read only memory (ROM), floppy disk, hard disk, or any other form of digital storage, local or remote. In some embodiments, a storage (not shown) may supplement or replace the memory 204. The storage may include any number and type of external memories that are accessible to the processor 302. For example, and without limitation, the storage may include a Secure Digital Card, an external flash memory, a portable compact disc read-only memory (CD-ROM), an optical storage device, a magnetic storage device, or any suitable combination of the foregoing.

As shown, the memory 204 stores the match cutting application 104 and an operating system 206 on which the match cutting application 104 runs. The operating system 206 may be, e.g., Linux®, Microsoft Windows®, or Android™. The match cutting application 104 is representative of an application, service, or other type of software that runs on the operating system 206. Functionality of the match cutting application 104 can be distributed across multiple pieces of software in some embodiments. In some embodiments, the match cutting application 104 is configured to receive video sequences as input, detect shot sequences within the video sequences, deduplicate the detected shot sequences, and generate candidate match cuts based on comparisons of encodings of pairs of the deduplicated shot sequences, as discussed in greater detail below in conjunction with FIGS. 4-6.

Figure 3:
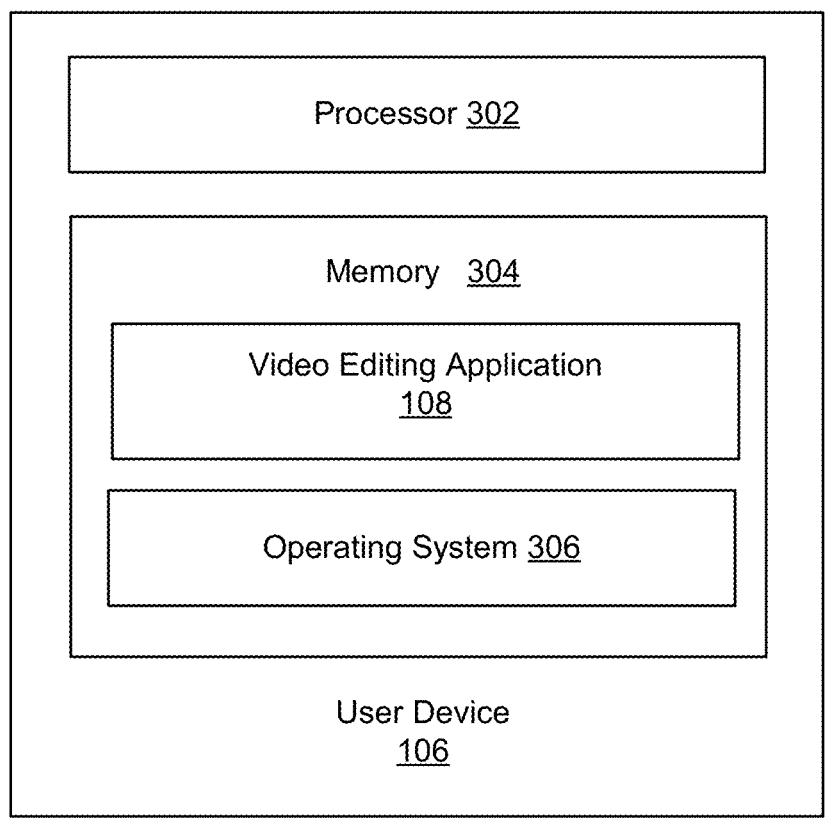
FIG. 3 is a conceptual illustration of the user device of FIG. 1, accordingly to various embodiments.

FIG. 3 is a conceptual illustration of the user device 106 FIG. 1, according to various embodiments. As shown, the user device 106 includes a processor 302 and a memory 304, which may perform similar functionalities as the processor 202 and the memory 204, respectively, of the server machine 102 described above in conjunction with FIG. 2. In some embodiments, a storage (not shown) may supplement or replace the memory 304.

As shown, the memory 304 stores the video editing application 108 and an operating system 306, which is similar to the operating system 206 described above in conjunction with FIG. 2. In some embodiments, the video editing application 108 is configured to display candidate match cuts to a user and permit the user to select among the candidate match cuts, edit the candidate match cuts, as well as create and/or edit video sequences to include the selected and/or edited match cuts, as discussed in greater detail below in conjunction with FIG. 4.

Generating Candidate Match Cuts

Figure 4:
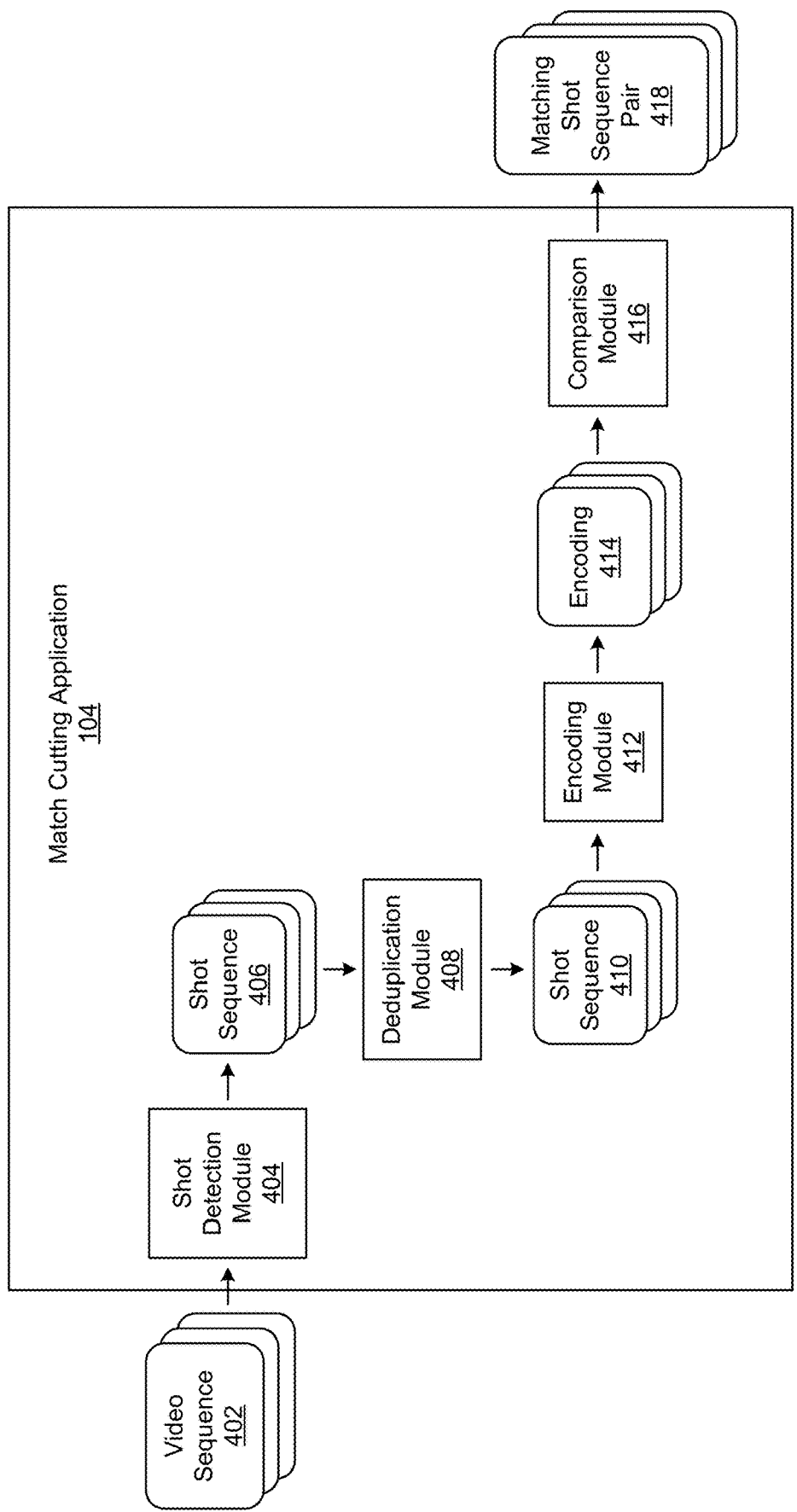
FIG. 4 is a conceptual illustration of the match cutting application of FIG. 1, according to various embodiments.

FIG. 4 is a conceptual illustration of the match cutting application 104 of FIG. 1, according to various embodiments. As shown, the match cutting application 104 includes a shot detection module 404, a deduplication module 408, an encoding module 412, and a comparison module 416.

The match cutting application 104 receives one or more video sequences as inputs. Each video sequence 402 includes, without limitation, any amount and type of video content. Examples of video content include, without limitation, any portion (including all) of feature length films, episodes of television programs, and music videos, to name a few.

When generating candidate match cuts, comparing pairs of shot sequences to identify candidate match cuts is less computationally expensive than comparing every pair of frames. The shot detection module 404, therefore, determines one or more shot sequences 406 within one or more video sequences 402. Each shot sequence 406 includes a set of contiguous frames within a video sequence 402 that usually have similar spatial-temporal properties and run for an uninterrupted period of time.

In some embodiments, the shot detection module 404 processes the video sequences 402 using any technically feasible shot detection technique to determine the shot sequences 406. Some examples of shot detection techniques include a multi-scale sum-of-absolute-differences algorithm, a motion-compensated residual energy algorithm, a histogram of differences algorithm, a difference of histograms algorithm, and so forth. One or more shot detection algorithms can be used to identify the boundaries between pairs of successive shot sequences within each video sequence 402. If multiple video sequences 402 are received, the match cutting application 104 can concatenate those video sequences 402 into a single video sequence in some embodiments, and then apply the shot detection technique(s) to the single video sequence. In other embodiments, the match cutting application 104 can separately apply the shot detection technique(s) to the multiple video sequences 402.

The deduplication module 408 generates a deduplicated set of shot sequences 410 by identifying and removing from consideration shot sequences 406 that are very similar to other shot sequences 406. As a general matter, shot sequences that are too similar are not suitable for generating candidate match cuts. For example, consider a scene in which two characters are engaged in a conversation and the shot sequences alternate between each character speaking. In such a case, the shot sequences associated with each character can be very similar to each other, and the deduplication module 408 can remove from consideration all but one of those shot sequences. The deduplication module 408 processes particular frames (e.g., mid-frames) of the shot sequences 406, or the entire shot sequences 406, using any technically feasible deduplication technique or techniques in some embodiments. Some examples of deduplication techniques include perceptual hashing and convolutional neural network-based techniques.

In addition to deduplicating the shot sequences 406, a module (not shown) of the match cutting application 104 can transform the deduplicated shot sequences 410 in some embodiments. For example, in some embodiments, the transformations can include shifting frames of the shot sequences 410 to the left, right, up, and/or down by various numbers of pixels. As another example, the transformations can include zooming frames of the shot sequences 410 in and/or out by various amounts. By comparing pairs of the shot sequences 410 as well as transformations thereof, the match cutting application 104 can determine pairs of shot sequences and/or transformations that best match each other in terms of subject matter and/or action. The subject matter can include visual and/or audio subject matter. The pairs of shot sequences and/or transformations can then be used to generate candidate match cuts between the pairs of shot sequences and/or transformations.

The encoding module 412 processes the deduplicated shot sequences 410 (and optionally transformations thereof) to generate an encoding for each of the shot sequences 410. The encoding for a shot sequence 410 can indicate visual element(s), action(s), and/or audio within the shot sequence 410. Any technically feasible encoding techniques that generate similar encodings for shot sequences having similar subject matter and/or action(s) can be used in some embodiments.

In one technique for generating encodings, the encoding module 412 performs an instance segmentation technique on the deduplicated shot sequences 410 (and optionally transformations thereof) to identify pixels that are associated with various classes of objects in one or more frames of each shot sequence 410. Any technically feasible instance segmentation technique, including techniques that apply machine learning models such as a Mask R-CNN (region-based convolutional neural network), can be employed in some embodiments. Based on the instance segmentation, the encoding module 412 generates an encoding that includes a pixel mask indicating pixels that are associated with particular types of object(s).

For example, to generate a candidate frame match cut of shot sequences that include similar silhouettes of humans, the encoding module 412 could perform instance segmentation on a mid-frame within each shot sequence 410 to identify pixels that are associated with humans. The encoding module 412 generates, for each shot sequence 410, a mask indicating pixels that are associated with any human, or with distinct humans, within the mid-frame of the shot sequence 410. Here, the mid-frame of a shot sequence 410 is assumed to be representative of the entire shot sequence 410 because, oftentimes, the frames within a shot sequence do not change significantly. In addition, computing an encoding based on a particular frame or particular frames (e.g., the mid-frame) within a shot sequence is typically less computationally expensive than computing an encoding based on all of the frames within the shot sequence.

In other embodiments, instance segmentation can be performed on any number of frames of the shot sequences 410, including entire shot sequences 410. Further, masks that are generated based on the instance segmentation can indicate any number and types of objects. In addition, the masks can indicate each object separately, or the masks may not distinguish between different objects of interest and/or different types of objects. For example, consider a shot in which a human is riding a bicycle. In such a case, an instance segmentation technique could be applied to identify pixels associated with the human and with the bicycle, which can be encoded either together or separately in a mask. If the human and bicycle pixels are encoded separately, then the match cutting application 104 could separately match the human and bicycle pixels to human and bicycle pixels in the masks for other shot sequences. If the human and bicycle pixels are encoded together, then the match cutting application 104 could match a silhouette of the human and bicycle to silhouettes of a human and bicycle (or other object(s)) in the masks for other shot sequences.

In another technique for generating encodings, the encoding module 412 performs an optical flow technique on the deduplicated shot sequences 410 (and optionally transformations thereof) to generate an encoding for each shot sequence 410 that includes an optical flow between frames within the shot sequence 410. The optical flow can indicate a distribution of velocities of objects in the frames, which can include velocities associated with camera movement and/or movement of the objects, themselves. Optical flow techniques can be used to generate candidate match cuts between pairs of shot sequences that have matching actions. Any technically feasible optical flow techniques can be employed in some embodiments. In some embodiments, an optical flow technique is performed on entire shot sequences 410, rather than particular frames (e.g., a mid-frame) within the shot sequences 410. In other embodiments, an optical flow technique can be performed on a subset of frames within each shot sequence 410.

In another technique for generating encodings, the encoding module 412 performs a pose estimation technique on the deduplicated shot sequences 410 (and optionally transformations thereof) to generate an encoding 414 for each shot sequence 410 that indicates the poses of one or more humans in particular frames (e.g., a mid-frame), or in all frames, of the shot sequence 410. The pose estimation technique can detect whether there are humans in the frame(s) and/or what poses the humans are in. Pose estimation techniques can be used to identify match cuts in which pairs of shot sequences have matching subject matter and/or actions. Any technically feasible pose estimation techniques can be employed in some embodiments, and the pose estimation techniques can detect, e.g., body part locations or particular poses (e.g., sitting, standing, running, etc.).

In another technique for generating encodings, the encoding module 412 performs an object detection technique on the deduplicated shot sequences 410 (and optionally transformations thereof) to generate an encoding 414 for each shot sequence 410 that indicates whether one or more types of objects are detected within a particular frame or particular frames (e.g., a mid-frame) of the shot sequence 410, or within the entire shot sequence 410. For example, the object detection technique could be performed to detect humans, bicycles, cups, and/or other types of objects, and an encoding 414 can indicate (e.g., with a 1 or 0) whether particular types of objects are included in a corresponding shot sequence 410. Any technically feasible object detection techniques, including techniques that apply machine learning models such as CNNs (convolutional neural networks), can be employed in some embodiments.

In another technique for generating encodings, the encoding module 412 performs a video-text retrieval technique on the deduplicated shot sequences 410 (and optionally transformations thereof) to generate an encoding 414 for each shot sequence 410 that includes text descriptions associated with a particular frame or particular frames (e.g., a mid-frame) of the shot sequence 410, or with the entire shot sequence 410. Any technically feasible video-text retrieval techniques, including techniques that apply machine learning models such as a CLIP4Clip model, can be employed in some embodiments. For example, in some embodiments, the CLIP4Clip model can be used to generate encodings in an embedding space in which images that are similar are closer to each other along with text descriptions of those images, and vice versa.

In another technique for generating encodings, the encoding module 412 performs a mel spectrogram or MFCC (mel frequency cepstral coefficients) technique on the deduplicated shot sequences 410 to generate an encoding 414 for each shot sequence 410 that indicates audio frequencies converted to the mel scale or a short-term power spectrum, respectively, of audio that is associated with the shot sequence 410. Mel spectrogram and MFCC techniques can be used to compare the audio within pairs of shot sequences and generate candidate match cuts between pairs of shot sequences that have matching audio.

In further techniques for generating encodings, the encoding module 412 employs pre-trained or general image and/or video embeddings. For example, the encodings can be embeddings that are learned via machine learning in some embodiments. Pre-trained or general image and/or video embeddings can be used to generate general candidate match cuts between pairs of shot sequences that have matching subject matter and/or action.

When the encoding module 412 detects different types of visual element(s), action(s), and/or audio (e.g., instance segmentation in addition to optical flow, pose, and mel spectrogram) within a shot sequence 410, the encoding module 412 can encode those visual element(s), action(s), and/or audio in any technically feasible manner. For example, encodings 414 for the different types of visual element(s), actions, and/or audio (e.g., a mask based on instance segmentation, an optical flow, and an estimated pose) could be concatenated together to generate an encoding 414 for the shot sequence 410.

Figure 5:
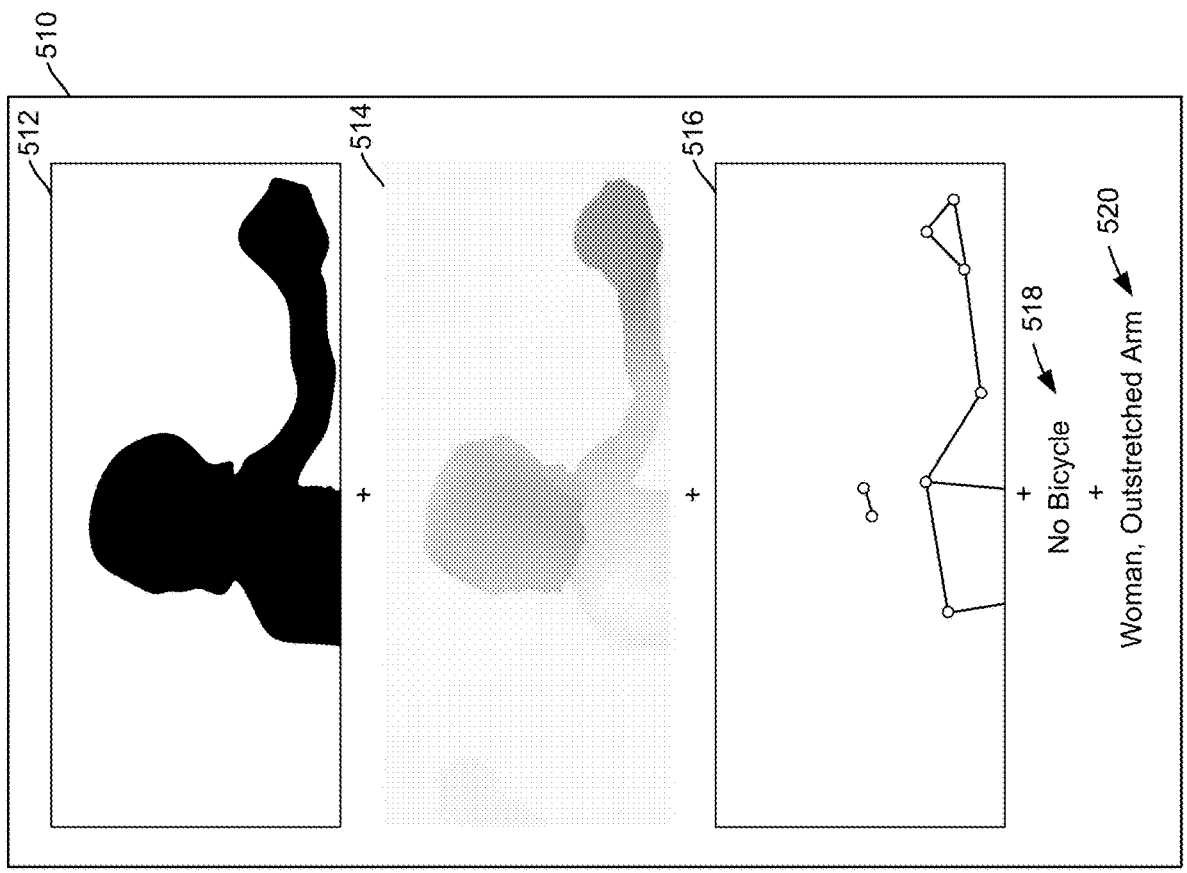
FIG. 5 illustrates the computation of an exemplar encoding for a shot sequence, according to various embodiments.
Figure 5:
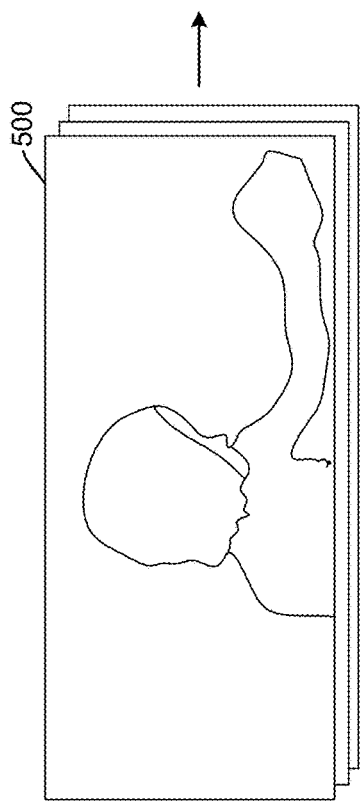

FIG. 5 illustrates the computation of an exemplar encoding for a shot sequence, according to various embodiments. As shown, a shot sequence 500 is processed by the encoding module 412 to generate an encoding 510 that includes a mask 512 indicating pixels associated with a human, an optical flow 514, a pose 516 of the human, an indication 518 that no bicycle object has been detected in the shot sequence 500, and a text description 520 of the shot sequence 500. Although an exemplar encoding 510 is shown for illustrative purposes, it should be understood that, in other embodiments, encodings can include different indications of visual element(s), action(s), and/or audio within shot sequences. As described, in some embodiments, the encoding module 412 can perform instance segmentation on a particular frame or particular frames (e.g., a mid-frame) of the shot sequence 500, or the entire shot sequence 500, to determine pixels associated with a human that are indicated by the mask 512. Further, in some embodiments, the encoding module 412 performs an optical flow technique to compute the optical flow 514 based on the entire shot sequence 500. Also, in some embodiments, the encoding module 412 can perform a pose estimation technique to determine the pose 516 of the one or more humans in a particular frame or particular frames (e.g., a mid-frame) of the shot sequence 500, or the entire shot sequence 500. In addition, in some embodiments, the encoding module 412 can perform an object detection technique to detect whether a bicycle is included in a particular frame or particular frames (e.g., a mid-frame) of the shot sequence 500, or the entire shot sequence 500. Further, in some embodiments, the encoding module 412 can perform a video-text retrieval technique to determine the text description 520 that is associated with a particular frame or particular frames (e.g., a mid-frame) of the shot sequence 500, or with the entire shot sequence 500. In the encoding 510, the mask 512, the optical flow 514, the pose 516, the indication 518 that no bicycle object is detected, and the text description 520 can be represented in any technically feasible manner. For example, the mask 512, the optical flow 514, the pose 516, the indication 518 that no bicycle object is detected, and the text description 520 could be concatenated together in a matrix or vector.

Returning to FIG. 4, the comparison module 416 compares the encodings 414 of shot sequences 410 to identify pairs of shot sequences that are suitable for candidate match cuts. As described, a match cut is a transition from one shot sequence to another shot sequence in which the shot sequences have matching subject matter and/or action. In some embodiments, the comparison module 416 compares encodings 414 that are associated with pairs of shot sequences using a distance metric to identify pairs of shot sequences that are similar to each other. Any technically feasible distance metric can be used in some embodiments, and the distance metric that is used generally depends on a type of encodings 414.

In some embodiments, when the encoding module 412 generates an encoding 414 that includes a mask of pixels that are associated with a particular type of object, then the comparison module 416 can compute an intersection over union (IOU) of the masks for each pair of shot sequences to determine a similarity between those shot sequences. The IOU can be defined as the area of an overlap between the masks divided by the area of a union between the masks, which is a measure of how much the masks overlap. A higher IOU score (i.e., an IOU score closer to 1.0) can indicate that frames (e.g., mid-frames) from a pair of shot sequences are better matches, while a lower IOU score (i.e., an IOU score closer to 0.0) can indicate that such frames are poorer matches.

In some embodiments, when the encoding module 412 generates an encoding 414 that includes an optical flow or a pose, then the comparison module 416 can compute the Euclidean distance between the optical flows or poses for each pair of shot sequences. For example, an optical flow can be represented as a matrix of numbers, and the Euclidean distance can be computed between the optical flow matrices associated with a pair of shot sequences.

In some embodiments, when the encoding module 412 generates an encoding 414 that indicates whether a type of object is detected within particular frame(s) or an entire shot sequence, then the comparison module 416 can determine whether the encoding 414 associated with a pair of shot sequences 410 indicates that frame(s) of both shot sequences 410 include the type of object.

In some embodiments, when the encoding module 412 generates an encoding 414 that includes a text description associated with a shot sequence, then the comparison module 416 can perform a nearest neighbor search within an associated embedding space, described above, to identify the nearest text descriptions associated with other shot sequences.

Additional examples of distance metrics that can be used in some embodiments include cosine distance, normalized Euclidean distance, L1 distance, a distance that is learned via a machine learning technique, or combinations thereof. The particular distance metric used is not, as a general matter, specific to any particular type of candidate match cut, data, or encoding. Instead, distance metrics can be interchangeable with other distance metrics. In some embodiments, the distance metric that is used in particular circumstances can be learned via a machine learning technique.

When the encoding 414 for each shot sequence 410 includes multiple different indications of visual element(s), action(s), and/or audio (e.g., a pixel mask based on instance segmentation in addition to an optical flow and a mel spectrogram), then the distance metric can weight the different indications in any technically feasible manner. For example, a user could specify that an IOU between masks associated with a pair of shot sequences should be weighted more heavily than a Euclidean distance between optical flows associated with the pair of shot sequences, or vice versa.

In some embodiments, prior to comparing the encodings 414 associated with pairs of shot sequences 410, the comparison module identifies intermediate pairs of shot sequences 410 using an approximation technique and the encodings 414. The approximation technique is performed to avoid comparing every pair of shot sequences using the distance metric, which can become computationally expensive as the number of shot sequences increases. Instead, only intermediate pairs of shot sequences 410 are compared using the distance metric. In some embodiments, the approximation technique is an approximate nearest neighbor (ANN) search technique, such as a k-d tree technique, in which the encodings 414 are hashed to create an index or other approximation data structure, and the index or other approximation data structure is then searched to find nearest matches to each shot sequence 410 that can be included, along with that shot sequence 410, in the intermediate pairs of shot sequences.

As shown, the comparison module 416 outputs a set of matching shot sequence pairs 418. In some embodiments, the comparison module 416 sorts shot sequence pairs based on associated distances that are computed according to the distance metric, as described above. Then, the comparison module 416 selects a predefined number of shot sequence pairs that are associated with the shortest distances, or shot sequence pairs that are associated with distances that are less than a predefined threshold, as the set of matching shot sequence pairs 418. The comparison module 416 can output the matching shot sequence pairs 418 in any technically feasible format. For example, the comparison module 416 could output the matching shot sequence pairs 418 in a format that can be imported into a video editing application, such as the video editing application 108 described above in conjunction with FIGS. 1 and 3. In some embodiments, the matching shot sequence pairs 418 can be presented, via the video editing application, to the user as candidate match cuts, and the user can select one or more of the candidate match cuts and use and/or edit the selected match cut(s). Alternatively, in some embodiments, the match cutting application 104 can automatically select one or more of the candidate cuts, and the user can then view and/or edit the selected match cut(s). For example, when a matching shot sequence pair 418 is determined based on IOU of masks for mid-frames of the shot sequence pair, a candidate match cut could cut the first shot sequence and the second shot sequence together at their mid-frames (i.e., trim frames after the mid-frame of the first shot sequence and before the mid-frame of the second shot sequence and cut the remaining frames of the first and second shot sequences together). In some embodiments, the matching shot sequence pairs 418 can be presented to the user without duplicate shot sequences. For example, pairs of shot sequences that share a first shot sequence can be presented together so that the first shot sequence is not presented multiple times with different second shot sequences. In addition, in some embodiments, the video editing application 108 can permit the user to create and/or edit video sequences that include the candidate match cuts.

Figure 6:
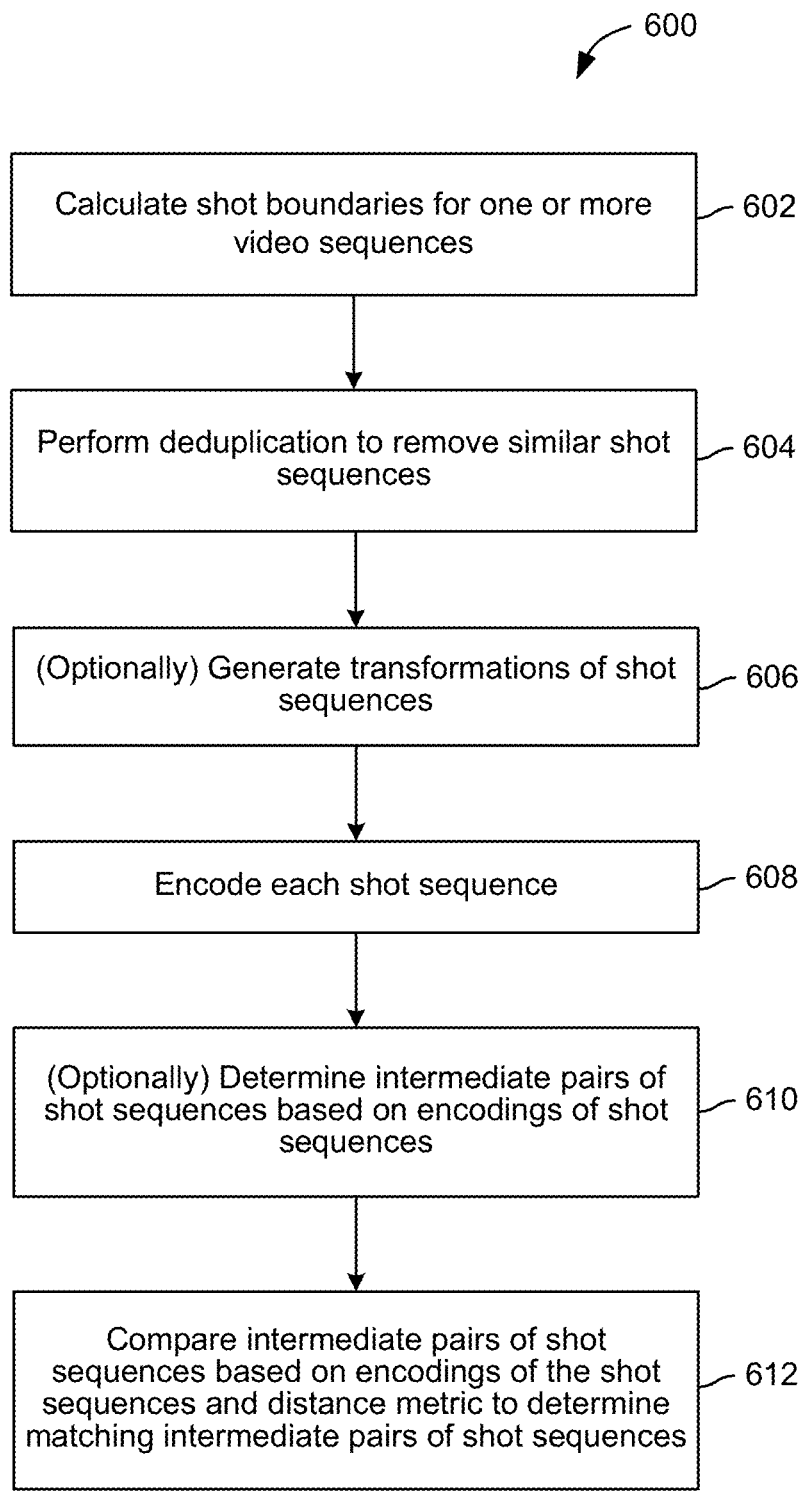
FIG. 6 is a flow diagram of method steps for generating candidate match cuts, according to various embodiments.

FIG. 6 is a flow diagram of method steps for generating candidate match cuts, according to various embodiments. Although the method steps are described in conjunction with the systems of FIG. 1-4, persons of ordinary skill in the art will understand that any system configured to perform the method steps, in any order, is within the scope of the present disclosure.

As shown, a method 600 begins at step 602, where the match cutting application 104 calculates shot boundaries for one or more video sequences. The shot boundaries are transitions between different shots and can be calculated via any technically feasible shot detection technique, such as a multi-scale sum-of-absolute-differences algorithm, a motion-compensated residual energy algorithm, a histogram of differences algorithm, or a difference of histograms algorithm.

At step 604, the match cutting application 104 performs deduplication to remove similar shot sequences. In some embodiments, the match cutting application 104 can perform perceptual hashing, convolutional neural network-based deduplication, or any other deduplication technique on the shot sequences.

At step 606, the match cutting application 104 optionally generates transformations of the shot sequences that have been deduplicated. In some embodiments, the transformations can include shifting and/or zooming frames of the shot sequences by various amounts.

At step 608, the match cutting application 104 encodes each of the shot sequences that have been deduplicated and (optionally) transformed. In some embodiments, the encoding can include a mask that indicates pixels associated with particular type(s) of objects, an optical flow, one or more poses, one or more detected objects, one or more text descriptions, mel spectrograms or MFCCs, image and/or video embeddings, etc., or a combination thereof. Various techniques for encoding shot sequences are described above in conjunction with FIGS. 4-5.

At step 610, the match cutting application 104 optionally determines intermediate pairs of shot sequences based on the encodings of shot sequences. In some embodiments, the intermediate pairs of shot sequences can be identified using an approximation technique, such as an ANN search technique, that avoids comparing every pair of shot sequences, which can become computationally expensive as the number of shot sequences increases.

At step 612, the match cutting application 104 compares the intermediate pairs of shot sequences based on the encodings of shot sequences and a distance metric to determine matching pairs of shot sequences. The matching pairs of shot sequences can then be edited together to generate candidate match cuts. In some embodiments, the distance metric used to determine the matching pairs of shot sequences can include an IOU, a Euclidean distance, a comparison of whether each shot sequence includes a type of object, a search within an embedding space, a cosine distance, a normalized Euclidean distance, an L1 distance, a distance that is learning via a machine learning technique, or a combination thereof. In some embodiments, the distance metric that is used in particular circumstances can also be learned via a machine learning technique.

At least one technical advantage of the disclosed techniques relative to the prior art is that the disclosed techniques facilitate the match cutting process by automatically generating and presenting candidate match cuts to a user, without requiring the user to manually compare shot sequences from one or multiple video sequences. In addition, the disclosed techniques can scale efficiently by using approximation techniques to avoid comparing every pair of shot sequences. These technical advantages represent one or more technological advancements over prior art approaches.

1. In some embodiments, a computer-implemented method comprises detecting a plurality of shot sequences within one or more video sequences, generating, for each shot sequence included in the plurality of shot sequences, an encoding associated with the shot sequence, and generating one or more candidate match cuts between one or more pairs of shot sequences based on the encodings associated with the plurality of shot sequences.

2. The computer-implemented method of clause 1, wherein a first encoding associated with a first shot sequence comprises at least one of a mask indicating pixels of one or more frames included in the first shot sequence that are associated with a given type of object, an optical flow, a pose, a text description, an indication of whether at least one frame of the first shot sequence includes a given type of object, a mel spectrogram, MFCC (mel frequency cepstral coefficients), or an image or video embedding.

3. The computer-implemented method of clauses 1 or 2, wherein generating the one or more candidate match cuts comprises comparing a plurality of pairs of shot sequences, and comparing each pair of shot sequences included in the plurality of pairs of shot sequences comprises determining a distance between encodings associated with the pair of shot sequences based on a distance metric.

4. The computer-implemented method of any of clauses 1-3, wherein the distance metric comprises at least one of an intersection over union, a Euclidean distance, a distance within an embedding space, a determination of whether each shot sequence in a pair of shot sequences includes a predefined object, a cosine distance, a normalized Euclidean distance, an L1 distance, or a distance that is learned via a machine learning technique.

5. The computer-implemented method of any of clauses 1-4, wherein generating the one or more candidate match cuts comprises performing one or more approximate nearest neighbor search operations to determine intermediate pairs of shot sequences, and comparing shot sequences included in each of the intermediate pairs of shot sequences based on encodings associated with the shot sequences.

6. The computer-implemented method of any of clauses 1-5, further comprising performing one or more deduplication operations to remove at least one shot sequence from the plurality of shot sequences.

7. The computer-implemented method of any of clauses 1-6, further comprising modifying at least one shot sequence included in the plurality of shot sequences to generate one or more modified shot sequences, and generating, for each modified shot sequence included in the one or more modified shot sequences, an encoding associated with the modified shot sequence, wherein the one or more candidate match cuts are further generated based on the encodings associated with the modified shot sequences.

8. The computer-implemented method of any of clauses 1-7, wherein modifying the at least one shot sequence comprises at least one of shifting the at least one shot sequence or zooming the at least one shot sequence.

9. The computer-implemented method of any of clauses 1-8, further comprising selecting one or more match cuts from the one or more candidate match cuts.

10. In some embodiments, one or more non-transitory computer-readable storage media include instructions that, when executed by at least one processor, cause the at least one processor to perform steps comprising detecting a plurality of shot sequences within one or more video sequences, generating, for each shot sequence included in the plurality of shot sequences, an encoding associated with the shot sequence, and generating one or more candidate match cuts between one or more pairs of shot sequences based on the encodings associated with the plurality of shot sequences.

11. The one or more non-transitory computer-readable storage media of clause 10, wherein a first encoding associated with a first shot sequence comprises at least one of a mask indicating pixels of one or more frames included in the first shot sequence that are associated with a given type of object, an optical flow, a pose, a text description, an indication of whether at least one frame of the first shot sequence includes a given type of object, mel spectrogram, MFCC (mel frequency cepstral coefficients), or an image or video embedding.

12. The one or more non-transitory computer-readable storage media of clauses 10 or 11, wherein generating the encoding associated with the shot sequence comprises performing at least one of one or more instance segmentation operations, one or more optical flow operations, one or more object detection operations, one or more pose estimation operations, one or more video-text retrieval operations, one or more image or video embedding operations, or one or more audio processing operations.

13. The one or more non-transitory computer-readable storage media of any of clauses 10-12, wherein the one or more instance segmentation operations, the one or more object detection operations, the one or more pose estimation operations, the one or more video-text retrieval operations, or the one or more image embedding operations are performed on a middle frame in the shot sequence.

14. The one or more non-transitory computer-readable storage media of any of clauses 10-13, wherein generating the one or more candidate match cuts comprises comparing a plurality of pairs of shot sequences, and comparing each pair of shot sequences included in the plurality of pairs of shot sequences comprises determining a distance between encodings associated with the pair of shot sequences based on a distance metric.

15. The one or more non-transitory computer-readable storage media of any of clauses 10-14, wherein the distance metric comprises at least one of an intersection over union, a Euclidean distance, a distance within an embedding space, a determination of whether each shot sequence in a pair of shot sequences includes a predefined object, a cosine distance, a normalized Euclidean distance, an L1 distance, or a distance that is learned via a machine learning technique.

16. The one or more non-transitory computer-readable storage media of any of clauses 10-15, wherein generating the one or more match cuts comprises performing one or more approximate nearest neighbor search operations to determine intermediate pairs of shot sequences, and comparing shot sequences included in each of the intermediate pairs of shot sequences based on encodings associated with the shot sequences.

17. The one or more non-transitory computer-readable storage media of any of clauses 10-16, the steps further comprising performing one or more deduplication operations to remove at least one shot sequence from the plurality of shot sequences.

18. The one or more non-transitory computer-readable storage media of any of clauses 10-17, the steps further comprising selecting one or more match cuts from the one or more candidate match cuts.

19. In some embodiments, a system comprises one or more memories storing instructions, and one or more processors that are coupled to the one or more memories and, when executing the instructions, are configured to detect a plurality of shot sequences within one or more video sequences, generate, for each shot sequence included in the plurality of shot sequences, an encoding associated with the shot sequence, and generate one or more candidate match cuts between one or more pairs of shot sequences based on the encodings associated with the plurality of shot sequences.

20. The system of clause 19, wherein generating the one or more candidate match cuts comprises comparing a plurality of pairs of shot sequences, and comparing each pair of shot sequences included in the plurality of pairs of shot sequences comprises determining a distance between encodings associated with the pair of shot sequences based on a distance metric.

Any and all combinations of any of the claim elements recited in any of the claims and/or any elements described in this application, in any fashion, fall within the contemplated scope of the present disclosure and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general-purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method, comprising:
 detecting a plurality of shot sequences within one or more video sequences;

generating, for each shot sequence included in the plurality of shot sequences, an encoding associated with the shot sequence;
comparing a first encoding associated with a first shot sequence included in the plurality of shot sequences with a plurality of other encodings associated with a plurality of other shot sequences included in the plurality of shot sequences to identify one or more shot sequences associated with encodings similar to the first encoding; and
generating one or more candidate match cuts for the first shot sequence based on the one or more shot sequences.

2. The computer-implemented method of claim 1, wherein the first encoding comprises at least one of a mask indicating pixels of one or more frames included in the first shot sequence that are associated with a given type of object, an optical flow, a pose, a text description, an indication of whether at least one frame of the first shot sequence includes a given type of object, a mel spectrogram, MFCC (mel frequency cepstral coefficients), or an image or video embedding.

3. The computer-implemented method of claim 1, further comprising comparing a plurality of pairs of shot sequences, and comparing each pair of shot sequences included in the plurality of pairs of shot sequences comprises determining a distance between encodings associated with that pair of shot sequences based on a distance metric.

4. The computer-implemented method of claim 3, wherein the distance metric comprises at least one of an intersection over union, a Euclidean distance, a distance within an embedding space, a determination of whether each shot sequence in a pair of shot sequences includes a predefined object, a cosine distance, a normalized Euclidean distance, an L1 distance, or a distance that is learned via a machine learning technique.

5. The computer-implemented method of claim 1, further comprising:
performing one or more approximate nearest neighbor search operations to determine intermediate pairs of shot sequences; and
comparing shot sequences included in each of the intermediate pairs of shot sequences based on encodings associated with the shot sequences.

6. The computer-implemented method of claim 1, further comprising performing one or more deduplication operations to remove at least one shot sequence from the plurality of shot sequences.

7. The computer-implemented method of claim 1, further comprising:
modifying at least one shot sequence included in the plurality of shot sequences to generate one or more modified shot sequences; and
generating, for each modified shot sequence included in the one or more modified shot sequences, an encoding associated with the modified shot sequence, wherein pairs of similar shot sequences are identified based on the encodings associated with the modified shot sequences.

8. The computer-implemented method of claim 7, wherein modifying the at least one shot sequence comprises at least one of shifting the at least one shot sequence or zooming the at least one shot sequence.

9. The computer-implemented method of claim 1, further comprising selecting one or more match cuts from the one or more candidate match cuts.

10. One or more non-transitory computer-readable storage media including instructions that, when executed by at least one processor, cause the at least one processor to perform steps comprising:
detecting a plurality of shot sequences within one or more video sequences;
generating, for each shot sequence included in the plurality of shot sequences, an encoding associated with the shot sequence; and
comparing a first encoding associated with a first shot sequence included in the plurality of shot sequences with a plurality of other encodings associated with a plurality of other shot sequences included in the plurality of shot sequences to identify one or more shot sequences associated with encodings similar to the first encoding; and
generating one or more candidate match cuts for the first shot sequence based on the one or more shot sequences.

11. The one or more non-transitory computer-readable storage media of claim 10, wherein the first encoding comprises at least one of a mask indicating pixels of one or more frames included in the first shot sequence that are associated with a given type of object, an optical flow, a pose, a text description, an indication of whether at least one frame of the first shot sequence includes a given type of object, mel spectrogram, MFCC (mel frequency cepstral coefficients), or an image or video embedding.

12. The one or more non-transitory computer-readable storage media of claim 10, wherein generating the encoding associated with the shot sequence comprises performing at least one of one or more instance segmentation operations, one or more optical flow operations, one or more object detection operations, one or more pose estimation operations, one or more video-text retrieval operations, one or more image or video embedding operations, or one or more audio processing operations.

13. The one or more non-transitory computer-readable storage media of claim 12, wherein the one or more instance segmentation operations, the one or more object detection operations, the one or more pose estimation operations, the one or more video-text retrieval operations, or the one or more image embedding operations are performed on a middle frame in the shot sequence.

14. The one or more non-transitory computer-readable storage media of claim 10, further comprising comparing a plurality of pairs of shot sequences, and comparing each pair of shot sequences included in the plurality of pairs of shot sequences comprises determining a distance between encodings associated with the pair of shot sequences based on a distance metric.

15. The one or more non-transitory computer-readable storage media of claim 14, wherein the distance metric comprises at least one of an intersection over union, a Euclidean distance, a distance within an embedding space, a determination of whether each shot sequence in a pair of shot sequences includes a predefined object, a cosine distance, a normalized Euclidean distance, an L1 distance, or a distance that is learned via a machine learning technique.

16. The one or more non-transitory computer-readable storage media of claim 10, further comprising:
performing one or more approximate nearest neighbor search operations to determine intermediate pairs of shot sequences; and
comparing shot sequences included in each of the intermediate pairs of shot sequences based on encodings associated with the shot sequences.

17. The one or more non-transitory computer-readable storage media of claim 10, the steps further comprising performing one or more deduplication operations to remove at least one shot sequence from the plurality of shot sequences.

18. The one or more non-transitory computer-readable storage media of claim 10, the steps further comprising selecting one or more match cuts from the one or more candidate match cuts.

19. A system, comprising:
one or more memories storing instructions; and
one or more processors that are coupled to the one or more memories and, when executing the instructions, are configured to:
   detect a plurality of shot sequences within one or more video sequences,
   generate, for each shot sequence included in the plurality of shot sequences, an encoding associated with the shot sequence,
   compare a first encoding associated with a first shot sequence included in the plurality of shot sequences with a plurality of other encodings associated with a plurality of other shot sequences included in the plurality of shot sequences to identify one or more shot sequences associated with encodings similar to the first encoding, and
   generate one or more candidate match cuts for the first shot sequence based on the one or more shot sequences.

20. The system of claim 19, further comprising comparing a plurality of pairs of shot sequences, and comparing each pair of shot sequences included in the plurality of pairs of shot sequences comprises determining a distance between encodings associated with the pair of shot sequences based on a distance metric.

* * * * *